United States Patent
Capriotti et al.

(10) Patent No.: US 6,748,056 B1
(45) Date of Patent: Jun. 8, 2004

(54) COORDINATION OF A TELEPHONY HANDSET SESSION WITH AN E-MAIL SESSION IN A UNIVERSAL MESSAGING SYSTEM

(75) Inventors: Steven John Capriotti, Collegeville, PA (US); Vikash Ramanlal, Wellingont (NZ); Gary Paul Russell, King of Prussia, PA (US); Regina Shires, Royersford, PA (US)

(73) Assignee: Unisys Corporation, Blue Bell, PA (US)

( * ) Notice: Subject to any disclaimer, the term of this patent is extended or adjusted under 35 U.S.C. 154(b) by 238 days.

(21) Appl. No.: 09/636,668

(22) Filed: Aug. 11, 2000

(51) Int. Cl.$^7$ .............................................. H04M 11/00
(52) U.S. Cl. ................................ 379/88.17; 455/414.1; 709/206
(58) Field of Search ........................... 379/88.13, 88.14, 379/88.17, 88.18, 211, 88.25, 88.12, 88.01, 93.28, 201.12, 207.11

(56) References Cited

U.S. PATENT DOCUMENTS

| | | | |
|---|---|---|---|
| 5,430,875 A | 7/1995 | Ma ............................ 395/650 |
| 5,511,160 A | 4/1996 | Robson ....................... 395/162 |
| 5,572,643 A | 11/1996 | Judson ....................... 395/793 |
| 5,621,891 A | 4/1997 | Ruhl et al. ................. 395/2.79 |
| 5,706,339 A | * | 1/1998 | Eisdorfer et al. ........ 379/211.03 |
| 5,737,619 A | 4/1998 | Judson ....................... 395/761 |
| 5,778,372 A | 7/1998 | Cordell et al. .............. 707/100 |
| 5,805,815 A | 9/1998 | Hill ......................... 395/200.48 |
| 5,978,848 A | 11/1999 | Maddalozzo, Jr. et al. . 709/227 |
| 5,991,365 A | * | 11/1999 | Pizano et al. ............. 379/88.13 |
| 6,028,922 A | * | 2/2000 | Deutsch et al. ........... 379/211.02 |
| 6,233,318 B1 | * | 5/2001 | Picard et al. ............. 379/88.17 |
| 6,282,270 B1 | * | 8/2001 | Porter ...................... 379/88.17 |

OTHER PUBLICATIONS

Music Startup/Shutdown Screens, at Wulfert.com, http://www.wulfert.com/screen/mucis.html, 1998–2000© Wulfert Online, 2 pages.

Ecamm are you watching?, Ecamm Network:TrekSounds Hack v3.3 for Palm OS Home Page, http://www.ecamm-m.com/palm/treksounds, 2000, 6 pages.

* cited by examiner

*Primary Examiner*—Fan Tsang
*Assistant Examiner*—Ming Chow
(74) *Attorney, Agent, or Firm*—Michael B. Atlass; Mark T. Starr; Woodcock Washburn LLP (57) ABSTRACT

A system and method for coordinating a telephony session on a voice messaging platform with an e-mail session on an e-mail messaging platform in an integrated universal messaging system are disclosed. The method, which is carried out by the system, comprises the steps of: (a) receiving a call on the voice messaging platform placed by a subscriber from a telephone handset and processing the call on the voice messaging platform in accordance with a first call flow; (b) invoking from the first call flow, a second call flow that initiates access to the subscriber's account on the e-mail messaging platform, the second call flow executing in parallel with, and asynchronously of, the first call flow; (c) continuing to execute the first call flow while the second call flow is executing; and (d) playing one or more prompts by the first call flow, as needed, to mask at least a portion of any delays experienced in receiving a response from the second call flow.

14 Claims, 5 Drawing Sheets

Figure 1

| NAINDEX | NAP Dialog ID | NAP Timestamp | Return NAINDEX | Return NAP Dialog ID | Return NAP Timestamp | Subscriber ID | UMsgCS Index | IP Address of HEAS Server | HEAS Session Index | E-Mail ID |
|---|---|---|---|---|---|---|---|---|---|---|
| | | | | | | | | | | |
| | | | | | | | | | | |
| | | | | | | | | | | |
| | | | | | | | | | | |

AGENT TABLE — 40

Figure 2

| UMsgCS Index | NAP Dialog ID | NAINDEX | NAP Timestamp | SLOT # of UMsg App | UMsgCS Timestamp | IP Address of HEAS server | Port Index | HEAS Session Index |
|---|---|---|---|---|---|---|---|---|
| | | | | | | | | |
| | | | | | | | | |
| | | | | | | | | |
| | | | | | | | | |

UMsgCS LIBRARY TABLE — 50

COORDINATION OF A TELEPHONY HANDSET SESSION WITH AN E-MAIL SESSION IN A UNIVERSAL MESSAGING SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to messaging systems, and more particularly, to universal messaging systems that integrate a voice (and possibly also fax) messaging platform with an electronic mail messaging platform to provide universal access to a subscriber's voice, fax, and e-mail messages from either a Web client, such as a Web browser, or a traditional telephone handset session on the voice mail platform.

BACKGROUND

So-called "Universal Messaging" systems are an attempt to combine traditional voice and fax messaging capabilities with electronic mail ("e-mail") capabilities. One approach to providing a universal messaging system is to integrate an existing voice and/or fax messaging platform (hereinafter "voice messaging platform") with an existing e-mail messaging platform. Each platform retains its own message store, but the system integrates those stores so that a subscriber can access all of the subscriber's voice, fax and e-mail messages from a single interface. Universal messaging systems typically provide access to messages from either a Web client, such as a Web browser, or a traditional telephone handset.

Many telephone companies today provide voice messaging services to their respective telephone customers. Such services typically are provided by a large-scale voice messaging platform, such as the Network Applications Platform (NAP) available from Unisys Corporation, Blue Bell, Pennsylvania, which is capable of providing voice and fax messaging capabilities to hundreds of thousands of subscribers. Recently, with the advent of the Internet and the World-Wide-Web ("the Web"), e-mail messaging has become in many cases as popular, if not more popular, than traditional voice messaging. Telephone companies would therefore like to be able to offer their customers a universal messaging solution that gives those customers a common point of access to both voice and e-mail messaging services.

Integrated universal messaging solutions are particularly attractive to telephone companies, because the existing voice messaging system of the telephone company can be integrated with a separate e-mail messaging platform without having to displace or replace the voice messaging system. A telephone company can choose to host the e-mail messaging platform itself, or to partner with an internet service provider (ISP) that already has an existing e-mail messaging platform. With an integrated universal messaging solution, the telephone company can then provide a new service (universal access to both e-mail and voice messages) to a subset of its existing voice messaging subscriber base without impacting the remainder of its subscriber base. Thus, an integrated universal messaging solution protects the telephone company's investment in its voice messaging system by adding to it instead of replacing it.

Integrated universal messaging systems usually provide message access via both a Web browser interface and a traditional telephony user interface (i.e., via a telephone handset). With the Web browser interface, a subscriber logs into the universal messaging system via an Internet connection and is presented with a single view of all voice, fax, and e-mail messages. E-mail messages are retrieved and displayed in the typical manner. Voice messages are typically retrieved as audio files that are then played over the subscriber's computer audio system by a Web browser plug-in or the like. With the telephony user interface (TUI), the subscriber is able to call into the voice messaging platform in the usual manner and to obtain a count of all waiting voice, fax, and e-mail messages. For example, the subscriber may hear a prompt such as "you have <n> voice messages, and <x> e-mails in your mailbox". The subscriber can listen to voice messages in the usual manner. For e-mail messages, the caller may be presented with the time and date of a message, the message size, and the number of attachments. Additionally, the sender and subject lines of an e-mail message may automatically be converted from text-to-speech and played back to the subscriber. If requested by the subscriber, the main body of the e-mail message may also be converted from text-to-speech and played to the caller.

In order to provide a subscriber with e-mail message status and content via a telephone handset in an integrated universal messaging solution, the TUI of the voice messaging platform must not only manage the session with the voice messaging platform, but also must manage the session with the e-mail messaging platform. One problem with managing both sessions is that these two environments have historically provided very different user experiences. Users of voice messaging systems have become accustomed to very fast, almost real-time responses for retrieval and playback of voice messages and are likely to hang up if forced to wait even several seconds for an operation to complete. On the contrary, because access to e-mail messages and other information over a network, such as the Internet, is inherently more prone to access delays, delays in retrieving an e-mail message from an e-mail client or Web browser are much more tolerated (and even expected) by those who use e-mail and the Web regularly and are accustomed to such delays. Consequently, there is a need for methods and apparatus that improve the coordination of telephony handset sessions with e-mail messaging sessions in integrated universal messaging systems and that help to bridge the gap between user experiences in both environments. The present invention addresses this need.

SUMMARY OF THE INVENTION

The present invention is directed to methods and apparatus for coordinating a telephony session on a voice messaging platform with an e-mail session on an e-mail messaging platform in an integrated universal messaging system in a manner that bridges the gap between user experiences in the two different environments.

A method of the present invention comprises the steps of: (a) receiving a call on the voice messaging platform placed by a subscriber from a telephone handset and processing the call on the voice messaging platform in accordance with a first call flow; (b) invoking from the first call flow, a second call flow that initiates access to the subscriber's account on the e-mail messaging platform, the second call flow executing in parallel with, and asynchronously of, the first call flow; (c) continuing to execute the first call flow while the second call flow is executing; and (d) playing one or more prompts by the first call flow, as needed, to mask at least a portion of any delays experienced in receiving a response from the second call flow. The step of invoking the second call flow from the first call flow can be made in response to a specific request for access from the subscriber, or it can be made automatically by the first call flow on behalf of the subscriber. Additionally, a telephony session identifier is created that identifies the subscriber's session on the voice messaging platform, and an e-mail session identifier is created that identifies the corresponding session on the e-mail messaging platform. An association is maintained between the telephony session identifier and the e-mail session identifier to enable the two sessions to be coordinated. According to another feature of the invention, a timestamp is generated each time access to the subscriber's e-mail account is initiated by the first call flow. The timestamp is passed with the request for access so that it can be returned with any response provided by the second call flow. When a response is received, the timestamp returned in the response is compared to the original timestamp passed with the request to ensure that the response provided by the second call flow corresponds to that particular request of the first call flow. The telephony session identifier may also be passed with the request and used in combination with the timestamp to verify the response.

A universal messaging system in accordance with the present invention comprises a voice messaging platform interfaced to a telephone network, an application executing on the voice messaging platform that comprises at least a first call flow and a second call flow, an e-mail platform comprising an e-mail server connected to a network external to the telephone network, and an interface component connected to the external network that provides access to the e-mail server via the external network upon request from the voice messaging platform. The application executing on the voice messaging platform processes calls received by the voice messaging platform from subscribers in accordance with the first call flow. Selected subscribers of the voice messaging platform have respective accounts on the e-mail server. According to the present invention, the first call flow invokes the second call flow to initiate access to a subscriber account on the e-mail messaging platform, and the second call flow thereafter executes in parallel with, and asynchronously of, the first call flow. The second call flow then interacts with the interface component to access the subscriber account on the e-mail server of the e-mail messaging platform. The first call flow continues to execute while the second call flow is executing and plays one or more prompts, as needed, to mask at least a portion of any delays experienced in receiving a response from the second call flow. The first call flow invokes the second call flow either (i) in response to a request by the subscriber for access to the subscriber's account on the e-mail messaging platform or (ii) automatically on behalf of the subscriber.

Preferably, the voice messaging platform of the universal messaging system creates a telephony session identifier associated with a subscriber's session on the voice messaging platform, and the interface component creates an e-mail session identifier associated with accesses to the e-mail messaging platform for that subscriber during the subscriber's session on the voice messaging platform. The voice messaging platform maintains an association between the telephony session identifier and the respective e-mail session identifier.

According to a further aspect of the present invention, the application executing on the voice messaging platform generates a timestamp at the time that access to a subscriber's e-mail account is initiated by the first call flow. The timestamp is then passed to the second call flow so that it can be returned by the second call flow in any response provided to the first call flow. When the application receives a response from the second call flow, it compares a timestamp returned with the response to the original timestamp generated by the application to ensure that the response provided by the second call flow corresponds to the particular access initiated by the first call flow. The telephony session identifier may also be passed with the request and used in combination with the timestamp to verify the response.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to methods and apparatus for coordinating a telephony session on a voice messaging platform with an e-mail session on an e-mail messaging platform in an integrated universal messaging system in a manner that bridges the gap between user experiences in the two different environments.

A method of the present invention comprises the steps of: (a) receiving a call on the voice messaging platform placed by a subscriber from a telephone handset and processing the call on the voice messaging platform in accordance with a first call flow; (b) invoking from the first call flow, a second call flow that initiates access to the subscriber's account on the e-mail messaging platform, the second call flow executing in parallel with, and asynchronously of, the first call flow; (c) continuing to execute the first call flow while the second call flow is executing; and (d) playing one or more prompts by the first call flow, as needed, to mask at least a portion of any delays experienced in receiving a response from the second call flow. The step of invoking the second call flow from the first call flow can be made in response to a specific request for access from the subscriber, or it can be made automatically by the first call flow on behalf of the subscriber. Additionally, a telephony session identifier is created that identifies the subscriber's session on the voice messaging platform, and an e-mail session identifier is created that identifies the corresponding session on the e-mail messaging platform. An association is maintained between the telephony session identifier and the e-mail session identifier to enable the two sessions to be coordinated. According to another feature of the invention, a timestamp is generated each time access to the subscriber's e-mail account is initiated by the first call flow. The timestamp is passed with the request for access so that it can be returned with any response provided by the second call flow. When a response is received, the timestamp returned in the response is compared to the original timestamp passed with the request to ensure that the response provided by the second call flow corresponds to that particular request of the first call flow. The telephony session identifier may also be passed with the request and used in combination with the timestamp to verify the response.

As used herein and in the claims, the following terms and phrases have the following meanings:

"Voice messaging platform" means a combination of hardware and/or software that provides a voice (and possibly also fax) messaging capability. The voice messaging platform interfaces to a telephone network, such as the Public Switched Telephone Network (PSTN), to enable subscribers to establish a call to the voice messaging platform from a telephone handset connected to the telephone network.

"E-mail messaging platform" means a combination of hardware and/or software that provides electronic mail messaging capabilities.

"Telephony session" means the time from when a call is received on a voice messaging platform to the time the call is terminated by the caller.

"E-mail session" means the collection of interactions with an e-mail messaging platform that occur during and that correspond to a particular telephony session.

"Call flow" means any program, procedure, script, state machine, or other series of instructions that define how a call is processed on a voice messaging platform during a telephony session.

Figure 1:
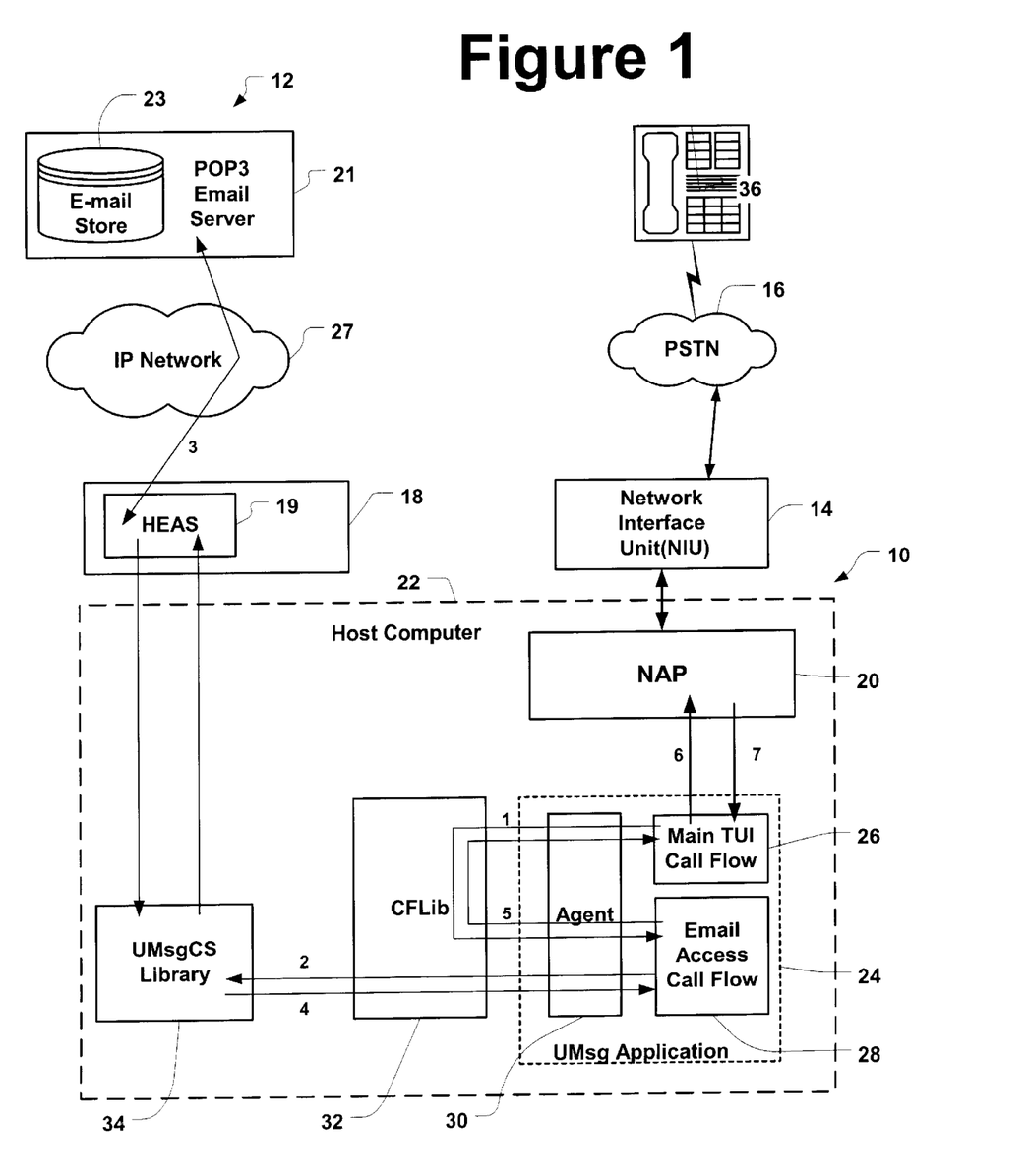
FIG. 1 is a block diagram of a universal messaging system in accordance with a preferred embodiment of the present invention.

Referring now to the drawings, wherein like numerals represent like elements throughout, FIG. 1 is a block diagram of a universal messaging system in accordance a preferred embodiment of the present invention. As shown, the universal messaging system comprises a voice messaging platform 10 integrated with an electronic mail messaging platform 12. A network interface unit (NIU) provides a physical connection between the voice messaging platform 10 and the Public Switched Telephone Network (PSTN) 16. One or more servers 18, on which a Handset E-mail Access Service (HEAS) software component 19 executes, assists in the integration between the voice messaging platform 10 and the e-mail messaging platform 12. In the preferred embodiment, the server 18 comprises an Intel-based server running the Microsoft Windows NT operating system. The HEAS 19 provides access to a subscriber's e-mails managed by an e-mail server 21 of the e-mail messaging platform 12. The voice messaging platform 10 uses the HEAS 19 to provide telephone handset access to e-mails. In the present embodiment, the e-mail server 21 implements the POP3 electronic mail messaging protocol, and the HEAS 19 uses the POP3 protocol to access a subscriber's e-mails, as described more fully below.

In the present embodiment, the voice messaging platform comprises a Network Applications Platform (NAP) 20 commercially available from Unisys Corporation, assignee of the present invention. The NAP 20 is a configuration of hardware and software that provides data and voice processing capabilities through applications running on a host computer system 22. The NAP 20, in combination with the NIU 14, provides the interface between these applications, called network applications, and the PSTN 16. The NAP 20 runs on selected Unisys A Series and ClearPath HMP NX computer systems running the Unisys MCP operating system. Further details of the structure and function of the NAP are provided in the following issued patents and pending applications, all of which are hereby incorporated by reference in their entireties:

U.S. Pat. No. 5,133,004, issued Jul. 21, 1992, entitled "Digital Computer Platform for Supporting Telephone Network Applications";

U.S. Pat. No. 5,323,450, issued Jun. 21, 1994, entitled "Telephone Network Applications Platform for Supporting Facsimile Applications";

U.S. Pat. No. 5,384,829, issued Jan. 24, 1995, entitled "Digital Computer Platform for Supporting Telephone Network Applications";

U.S. Pat. No. 5,493,606, issued Feb. 20, 1996, entitled "Multi-Lingual Prompt Management System for a Network Applications Platform";

U.S. Pat. No. 6,058,166, issued May 2, 2000, entitled "Enhanced Multi-Lingual Prompt Management in a Voice Messaging System With Support for Speech Recognition";

U.S. patent application Ser. No. 09/161,214, filed Sep. 25, 1998, entitled "Multiple Node Messaging System Wherein Nodes Have Shared Access To Message Stores Of Other Nodes";

U.S. patent application Ser. No. 09/307,014, filed May 7, 1999, entitled "Inter-System Call Transfer"; and U.S. patent application Ser. No. 09/451,077, filed Nov. 30, 1999, entitled "Method and Apparatus for Preventing Hung Calls During Protocol Violations in a Voice Messaging System".

Network applications running on the NAP 20 can provide enhanced services for telephone networks, such as Call Answer, Call Forward, Voice Store and Forward, Voice Mail, Bank By Phone, Emergency Number Facilities, Directory Assistance, Operator Assistance, Call Screening, Automatic Wake-up Services, and the like. At least a portion of the universal messaging system of the present invention is implemented in the form of a network application 24 (hereinafter "the Universal Messaging Application" or "UMsg Application"), running on the NAP 20. A network application, like the Universal Messaging Application 24, comprises one or more call flows which determine the functionality of the application. A call flow defines how a call is processed by the application from the time it is connected until it is disconnected. It determines how a network application will react to various telephony-related events. In particular, a call flow specifies each function or processing step to be executed during a telephone call, the possible results for each function, the decision path to be followed based on the result, and each prompt or voice message to be played during the course of the telephone call.

A call flow is comprised of a sequence of call states. As used herein, the phrase "to play a prompt" and variations thereof means to output the digitized voice of a prompt over a telephone connection or the like so that it can be heard by a caller. A call state is one state, or point, in a call flow. At any given time, each call coming into a network application has a finite call state. At a given call state, a given function is performed and the results of the function point either to a next state, or to an exit state. The function can lead to one or many results.

On the NAP 20, a network application developer can specify different call types to be handled by a network application. Each call type can be serviced by a different call flow and has a unique identifier associated with it. An Incoming Call (INCMG) state is the first call state in every network application. The INCMG call state identifies the type of call received by the NAP 20 and routes that call to the appropriate call flow of the application. The different call types must be specified in the network application, and they must also be defined to the NAP 20 when the network application is installed on the system. Once the different call types have been defined, the NAP 20 is able to identify the different call types and to return the appropriate call flow identifier in the INCMG call state when a call is received, so that the call can be processed by the appropriate call flow. Each call processed by the NAP 20 is referred to as a dialog.

On the NAP 20, a call flow can execute two kinds of functions—core functions and custom functions. Core functions are pre-coded functions provided with the NAP 20. These functions provide basic telephony services such as initiating a call, playing a voice prompt, collecting digits, and the like. Custom functions are application-specific functions that the application developer creates to perform functions not available using the core functions. For example, the application may require the retrieval of information from an application-specific database. Custom functions can be written in any programming language that the underlying computer system 22 (e.g. UNISYS A Series or ClearPath HMP NX) on which the NAP 20 is implemented can execute, such as, for example, LINC, ALGOL, COBOL, C or the like.

On the NAP 20, network applications are created using two personal computer (PC) based applications—PC SPIN and PC NAPTool. PC SPIN is a modified form of the SPIN program described in commonly assigned U.S. Pat. No. 5,493,606, and is used by an application developer to create and modify sets of prompt definitions and related information required to expand and play prompts on the system. PC NAPTool is used by a network application developer to create and edit the call flows of a network application. The PC SPIN and PC NAPTool programs run in the Microsoft Windows environment. Further details concerning the use of the PC SPIN and PC NAPTool programs to create a network application are provided in U.S. Pat. Nos. 5,493,606 and 6,058,166.

Once created, the files and information comprising a network application are transferred from the PC environment to the NAP 20. An Installation Manager program takes the transferred information and installs it in appropriate files on the host computer 22 of the NAP 20 for use during execution of the network application. In particular, a representation of each call flow of the network application is stored in a CALLFLOWS file. This file specifies the functions to be performed at each call state and the logic that controls the flow of execution from state-to-state. An INSPARAM file contains certain installation parameters associated with the network application. A COREDEF file provides certain default input parameters for certain core functions, particularly those that may require site-specific changes, and a CUSTATTR file contains attributes of all custom functions written for the network.

A network application executes in a runtime environment on the NAP 20. Multiple network applications can be installed and run on a single NAP 20, with each network application running in its own runtime environment. The runtime environment for a given network application includes a core function library that contains the executable code for each core function, and a custom function library that contains the executable code for each custom function written for the network application. Another interface is provided for custom functions written in the LINC programming language.

A primary component of the runtime environment is called the Agent. The Agent is a software component that (i) performs and controls call flow execution (the next function to be executed is based on the result of the previous function), (ii) passes parameters to various functions, (iii) translates new dialog activity into call states, (iv) saves information from NAP responses for use during call flow execution, and (v) enters call flow information into memory-based state tables. Execution of a call flow by the Agent is interpretive; the Agent interprets the representation of the call flow contained in the CALLFLOWS file. At each call state, the Agent invokes the specified core function or custom function from the appropriate library.

U.S. patent application Ser. No. 08/964,744, filed Nov. 5, 1997, entitled "Methods and Apparatus for Providing External Access to Executable Call Flows of a Network Application," which is incorporated herein by reference in its entirety, describes a generalized library mechanism of the NAP 20 that enables network applications or other client applications that may be executing on the computer system 22 that hosts the NAP 20 to externally call and initiate execution of selected call flows of other network applications. Each network or client application involved links to a call flow library running on the host computer system.

As described in the co-pending application, the call flow library to which other network or client applications link is itself a computer program that executes on the host computer system 22. When a network application is installed on the NAP 20, an application name is assigned to the application using a NAP administration facility. For network applications that are intended to be call flow providers (i.e., accessible by other client or network applications using the call flow library facility), the application developer can also assign a call flow provider name. The application name and call flow provider name of a network application are stored in its INSPARAM file. During installation of a network application, the NAP 20 initiates an Agent for the network application. The Agent reads the INSPARAM file to obtain certain installation information for the network application. The presence of a call flow provider name and/or application name in the INSPARAM file indicates to the Agent that the network application is to serve as a call flow provider and must therefore be linked to the call flow library.

For each network application that is linked to the call flow library as a call flow provider, an entry is made in a routing table of the call flow library. Each entry of the routing table contains a SLOT # field that contains an index into the routing table for the network application, an APPNAME field that holds the application name assigned to the network application, a CALLFLOW_PROVNAME field that holds the call flow provider name assigned to the network application, a CONNINDEX field that holds a connection index assigned to the linkage between the network application and the call flow library, and a STATUS field that identifies whether the network application is available (i.e., installed and running on the NAP system).

Other applications, including other network applications, that wish to call and initiate execution of a call flow of a network application that is serving as a call flow provider, must also link to the call flow library. This is done within the program code of that network or client application. Once linked to the call flow library, a GETLIBINX( ) procedure can be called by a client or network application to locate the routing table entry (SLOT #) of a network application that the client application wishes to access, so that the connection index associated with its linkage to the call flow library can be obtained. Once this information is known, the client application can initiate execution of a selected call flow of the network application serving as the call flow provider. Parameters can be passed to the selected call flow of the call flow provider and results can be returned to the client application.

Referring again to FIG. 1, the UMsg Application 24 executing on the NAP 20 comprises a set of Main Telephony User Interface (TUI) Call Flows 26 and a second set of E-mail Access Call Flows 28. Hereinafter, the terms "Main TUI Call Flows 26" and "E-mail Access Call Flows 28" may be used in the singular, when referring to one call flow of the respective set, or in the plural, when referring to the collection of call flows of the respective set, as the case may require. When the Universal Messaging Application 24 is installed on the NAP 20, the NAP 20 initiates an Agent 30 for the UMsg Application 24.

A Universal Messaging Client Services library software component 34 (hereinafter "UMsgCS Library"), which comprises a set of executable software routines that execute on the host computer 22, interfaces the host computer system 22 and NAP 20 to the HEAS 19. The UMsgCS Library 34 communicates with the HEAS 19 using a sockets protocol and is responsible for socket management. The UMsgCS Library 34 also performs data translation between the host computer system 22 and the server 18.

A Call Flow Library 32 of the type described above is used to create client-server relationships among the sets of call flows 26 and 28 of the UMsg Application 24 and the UMsgCS Library 34. The UMsgCS Library 34 serves as a call flow provider to the set of E-mail Access Call Flows 28 of the UMsg Application 24. The E-mail Access Call Flows 28, in addition to serving as a client of the UMsgCS Library 34, also serve as a call flow provider to the Main TUI Call Flows 26 of the UMsg Application 24. Thus, the E-mail Access Call Flows 28 serve a dual role as both a client and a call flow provider.

In order for the proper client-server relationships to be set up, the Agent 30 (on behalf of the UMsg Application 24) and the UMsgCS Library 34 are required to register with the Call Flow Library 32. The registration process is described more fully in co-pending application Ser. No. 08/964,744. Data is passed as part of the registration process that represents the logical name of each call flow library provider. The logical name (known as call flow provider name) of the UMsg Application 24 and the UMsgCS Library 34 are entered into the routing table within the Call Flow Library 32. As mentioned above, each entry in the routing table is indexed by a respective SLOT #, which is used by a client for routing purposes.

In greater detail, when the Agent 30 (on behalf of the UMsg Application 24) initializes, it registers with the Call Flow Library 32 and then invokes the GETLIBINX( ) procedure, passing the routing name of the UMsg Application 24. In the present embodiment, the routing name of the UMsg Application 24 is "UVMSEXPORT." The GETLIBINX( ) procedure returns the SLOT # associated with that name. The SLOT # for the UMsg Application 24 is used in all interactions with the UMsgCS Library 34 so that return routing (i.e., passing results back to the call flows of the UMsg Application 24) can be accomplished. The Agent 30 also uses the GETLIBINX( ) procedure to obtain the SLOT # for the UMsgCS Library 34. The logical or routing name of the UMsgCS Library 34 is "UMSGCSLIB". The SLOT # of the UMsgCS Library 34 is used as the primary routing tag in all interactions with the UMsgCS Library 34.

In order to coordinate and maintain an association between a particular NAP dialog (i.e., a telephony session established when a call is received by the NAP 20 from a telephone handset 36 on the PSTN 16) and an associated e-mail session on the e-mail messaging platform 12, the Agent 30, the UMsgCS Library 34, and the HEAS 19, each maintain a table of information containing entries for the sessions or dialogs that it manages.

Figure 2:
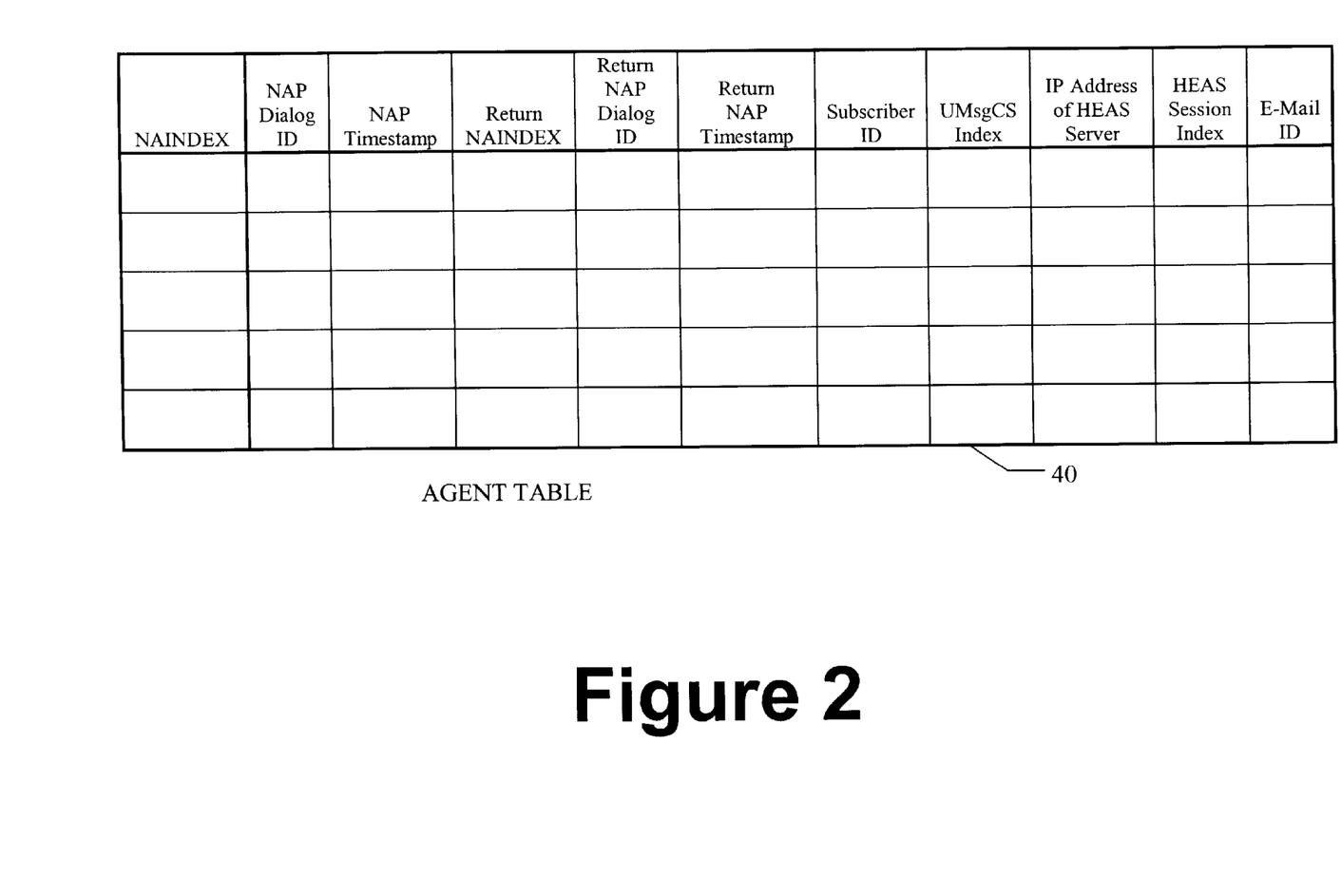
FIG. 2 graphically illustrates the contents of a first table maintained by the universal messaging system of FIG. 1 in accordance with the present invention.

FIG. 2 illustrates the contents of the table 40 maintained by the Agent 30. An entry in the table 40 is made each time a call flow makes a request to the UMsgCS Library 34 via the Call Flow Library 32. An NAINDEX field serves as an index into the table 40 for a given entry and thus represents the particular request. A NAP Dialog ID field identifies the NAP dialog (i.e., telephony session) that made the request. A NAP Timestamp field contains an indication of the time that the request was made. This field is used to help determine whether a response received from the UMsgCS Library 34 is in fact a response to the particular request. The Subscriber ID field identifies the subscriber making the request.

The values in the NAINDEX field and NAP Timestamp field are generated by the Agent 30. The NAP Dialog ID is generated by the NAP 20 and is made available in an incoming call response or is available to the Agent 30 when requested for by the Agent 30. The Subscriber ID is data that is passed on to the call flows of the UMsg Application 24 when the subscriber successfully logs onto the NAP with his/her personal identification number (PIN) or password. When available, the incoming call response from the NAP 20 returns the calling number, and in that case, the Subscriber ID will already be known to the call flows. If the Subscriber ID is not available from the NAP incoming call response, then the call flow will ask for it from the subscriber.

On the first successful access of the subscriber's e-mail account, the HEAS 19 and UMsgCS Library 34 return to the Agent 30 an index into the table maintained by the UMsgCS Library 34 (UMsgCS Index), the IP Address of the NT server 18 on which the HEAS 19 resides, and a HEAS Session Index generated by the HEAS to represent its particular session with the e-mail server 21. In the present embodiment, these values collectively define an e-mail session identifier. These values are stored by the Agent 30 in the UMsgCS Index, IP Address of HEAS Server, and HEAS Session Index fields of the table 40. When a subsequent request for access or playback of a specific e-mail is made by the subscriber, the Agent 30 also stores an identifier for that e-mail in the E-mail ID field.

The Agent table 40 also has three fields labeled Return NAINDEX, Return NAP Dialog ID, and Return NAP Timestamp. As described more fully below, these fields are used when one call flow (e.g., the E-mail Access Call Flow 28) has been invoked by another call flow (e.g., the Main TUI Call Flow 26) in order to record the NAINDEX, NAP Dialog ID, and NAP Timestamp of the invoking call flow so that those values can be returned to the invoking call flow with any response provided by the call flow that has been invoked.

Figure 3:
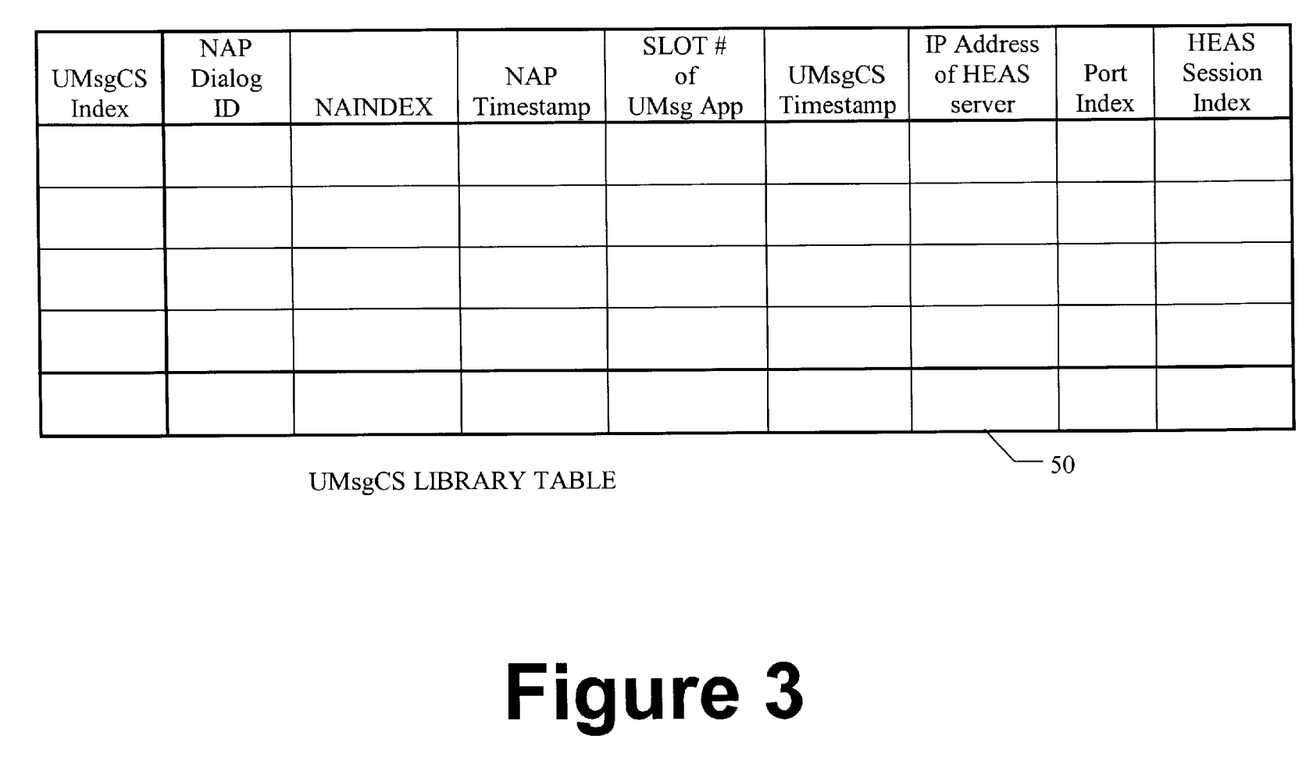
FIG. 3 graphically illustrates the contents of a second table maintained by the universal messaging system of FIG. 1 in accordance with the present invention.

FIG. 3 illustrates the contents of a table 50 maintained by the UMsgCS Library 34. As shown, the UMsgCS Index field serves as the index into the table. When the UMsgCS Library 34 receives a request from the Agent 30 on behalf of an E-Mail Access Call Flow 28, the Agent 30 passes the NAINDEX, NAP Dialog ID, and NAP Timestamp values from its table entry (table 40) for the E-Mail Access Call Flow in a header to the UMsgCS Library 34. The UMsgCS Library 34 stores these values in the corresponding NAP Dialog ID, NAINDEX, and NAP Timestamp fields of its table. These values are what enable the Agent 30 to synchronize a response from the UMsgCS Library 34 with the originating E-Mail Access Call Flow 28. In addition, the UMsgCS Library 34 receives the SLOT # of the UMsg Application 24 entry in the routing table of the Call Flow Library 32. This value is needed by the UMsgCS Library 34 to route a response back to the UMsg Application 24 (actually back to the Agent 30 on behalf of the originating call flow) via the Call Flow Library 32. The UMsgCS Library 34 also generates its own timestamp for the request and stores that in the UMsgCS Timestamp field of the table 50. This enables the UMsgCS Library 34 to generate a timeout indication in the event that the HEAS 19 does not respond in a predetermined period of time. In the next two fields, the UMsgCS Library 34 stores the IP Address of the HEAS server 18 that will service a particular request, and a Port Index associated with the socket over which the UMsgCS Library 34 will communicate with the HEAS 19. After the first reply of the HEAS in response to a logon to the subscriber's e-mail account, the HEAS will return its e-mail session index, which the UMsgCS Library 34 will store in the HEAS Session Index field. Note that the values in the NAP Dialog ID, NAINDEX, NAP Timestamp, SLOT # of UMsg App, and UMsg Timestamp fields are received or generated anew for each separate interaction with or request to access the subscriber's e-mail information. On the contrary, the IP Address, Port Index, and HEAS Session Index fields remain constant for the entire telephony session of a subscriber. That is, the subscriber may make a number of separate requests, such as requesting playback of different messages and message sections, each of which will result in a new set of NAP Dialog ID, NAINDEX, NAP Timestamp, SLOT #, and UMsg Timestamp values. The UP Address, Port Index, and HEAS Session Index fields will, however, remain constant over that series of requests until the subscriber terminates the telephony session.

Figure 4:
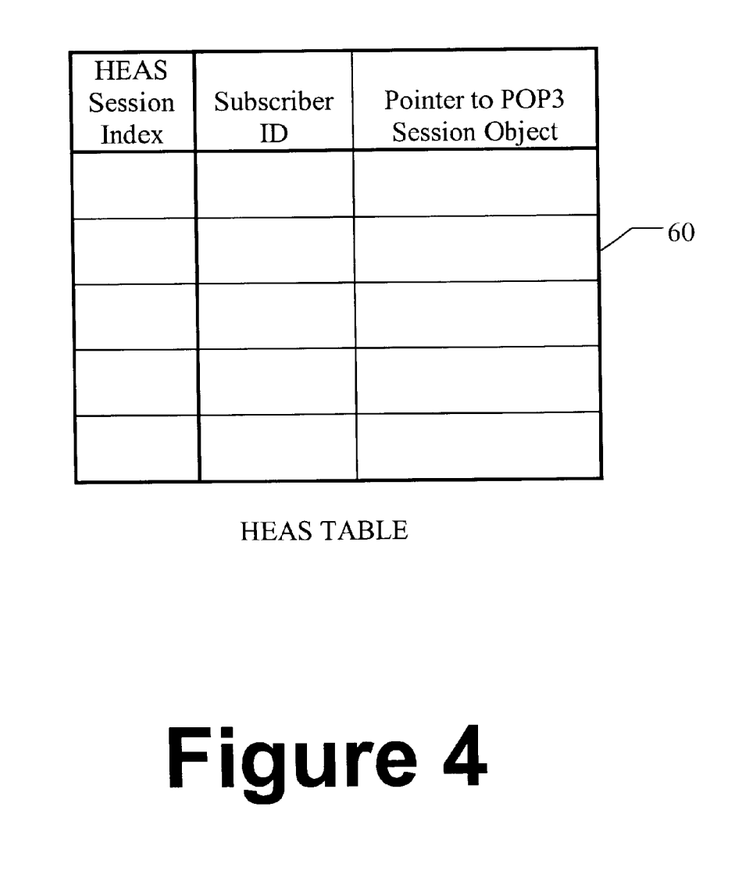
FIG. 4 graphically illustrates the contents of a third table maintained by the universal messaging system of FIG. 1 in accordance with the present invention.

FIG. 4 illustrates the contents of a table 60 maintained by the HEAS 19. As shown, the HEAS Session Index, which represents a particular session with the e-mail server 21 on behalf of a subscriber, is stored in the first field of the table 60 and serves as the index into the table. Each entry in the table 60 includes a Subscriber ID field that identifies the subscriber and a field containing a pointer to the POP3 Session Object that represents the subscriber's session with the e-mail server 21. A POP3 Session Object contains, for each e-mail message in a subscriber's e-mail "mailbox," an E-mail ID for that message, a pointer to the header information of the message (e.g., To, From, Subject), a pointer to the e-mail message body text, a pointer to the entire e-mail message, and a socket identifier that identifies the socket connection between the HEAS 19 and the e-mail server 21. After initial access to the e-mail message store for a given subscriber, all of the e-mail message data is cached in the POP3 Session Object by the HEAS 19 to speed subsequent requests for different parts of the same e-mail message.

Figure 5:
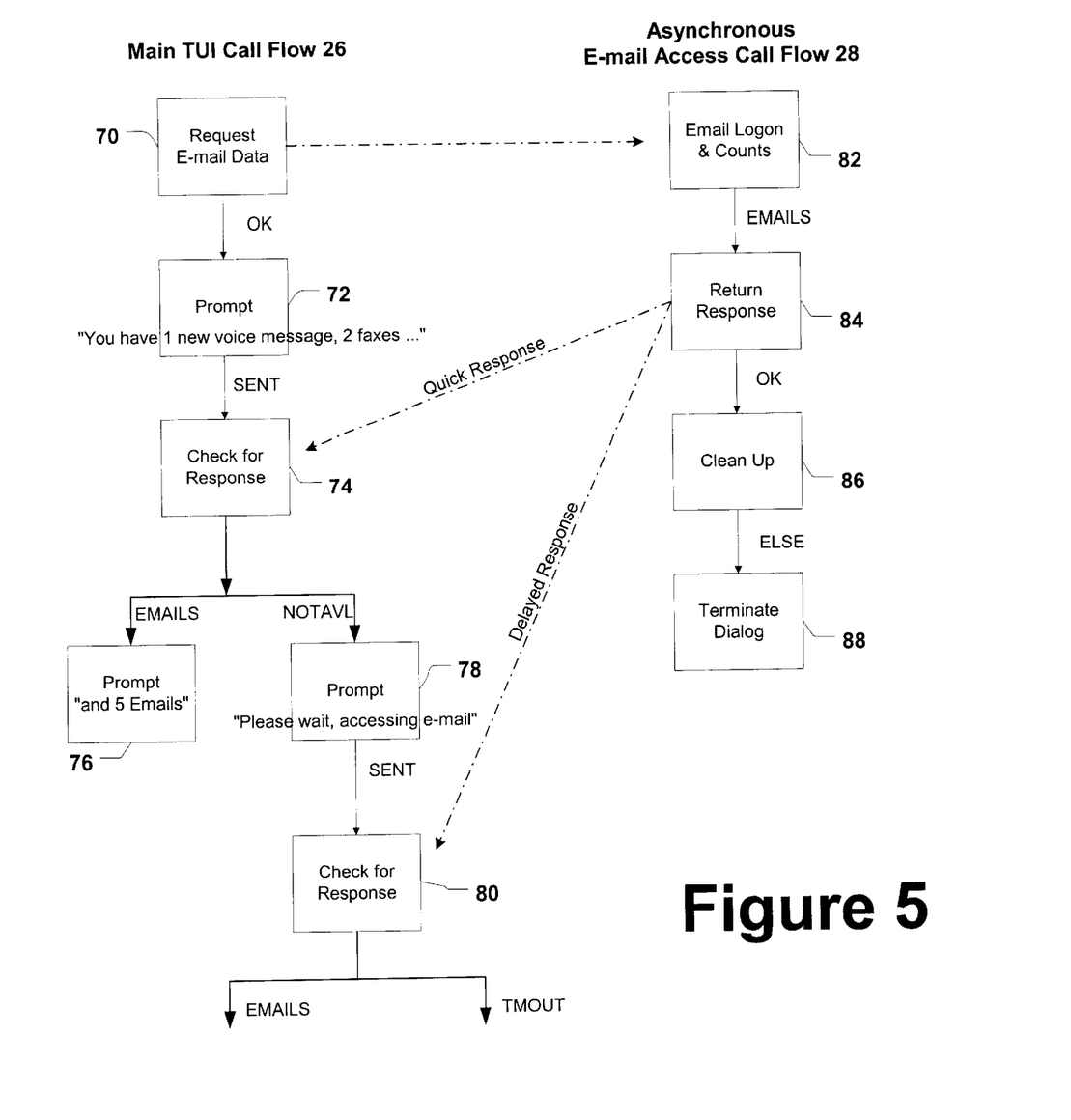
FIG. 5 is a flow diagram illustrating an exemplary application of a method of the present invention.

FIG. 5 is a flow diagram illustrating an exemplary application of the method of the present invention in the context of the system illustrated in FIGS. 1–4. In this diagram, an exemplary first call flow (Main TUI Call Flow 26) is illustrated along side an exemplary second call flow (E-mail Access Call Flow 28). Each block on the diagram represents a single call state of a call flow. Each call state may comprise a specific operation (such as Play a Prompt) or a more complicated interaction (such as E-mail Logon and Counts). The outcome of a state always produces at least one result, but in most cases there are many possible results. The result of a call state determines the next state to be executed. The dashed lines in FIG. 5 represent data interaction between the two call flows.

In accordance with the present invention, a call is received by the voice messaging platform from a subscriber using a telephone handset connected to the PSTN. The voice messaging platform, and more particularly in the present embodiment, the UMsg Application 24 executing on the NAP 20, begins processing the call in accordance with the Main TUI Call Flow 26. At a certain call state 70 of the Main TUI Call Flow 26, a request is made to logon to the subscriber's e-mail account on the e-mail messaging platform and to obtain a count of outstanding e-mail messages. This request could be made by the subscriber, or the request could be initiated automatically by the Main TUI Call Flow 26 on behalf of the subscriber. As indicated by the dashed line, the request for e-mail access causes the E-mail Access Call Flow 28 to be invoked. At call state 82 of the E-mail Access Call Flow 28, the call flow invokes a series of core functions that utilize the UMsgCS Library 34 to logon to and access the count information for the subscriber's account on the e-mail messaging platform. Importantly, the execution of the E-mail Access Call Flow 28 and of any UMsgCS Library 34 functions occurs in parallel with and asynchronously of the Main TUI Call Flow 26.

As shown, once the request for e-mail access is initiated at call state 70, control of the Main TUI Call Flow 26 proceeds to step 72 (again, in parallel with and asynchronously of the E-mail Access Call Flow 28). At call state 72, the Main TUI Call Flow 26 plays a prompt that informs the subscriber of the number of new voice and fax messages the subscriber has on the voice messaging platform. Immediately thereafter, control passes to call state 74 where the Main TUI Call Flow 26 checks whether a response to the e-mail logon and count request has been provided by the E-mail Access Call Flow 28. If, as indicated by the dashed arrow labeled "Quick Response," the E-mail Access Call Flow 28 has responded by that time, then control passes to step 76 where an additional prompt is played to indicate the number of new e-mail messages based on the count information obtained in the response. Further in accordance with the present invention, however, if at call state 74 a response had not yet been received from the E-mail Access Call Flow 28, then control passes to step 78 where a longer prompt ("Please wait, accessing your e-mail") is played to the subscriber in an effort to mask the delay in receiving the response. After playing the prompt, the Main TUI Call Flow 26 transitions to state 80 where it again checks whether a response has been received from the E-mail Access Call Flow 28. Assuming that a response is received sometime during the playing of the prompt in state 78 (as indicated by the dashed line labeled "Delayed Response"), control will pass from state 80 to state 76 so that the count information can be played to the subscriber. If a response is not available at state 80, then the Main TUI Call Flow 26 might satisfy a timeout condition and report an error to the subscriber.

After the E-mail Access Call Flow 28 returns a response to the Main TUI Call Flow 26 in step 84, control passes to step 86 where certain clean up procedures are executed, and the call flow is then terminated at state 88. Note that in the preferred embodiment, the NAP 20 treats the invocation and execution of the E-mail Access Call Flow 28 as a new NAP dialog.

With reference to FIGS. 1–4, the process illustrated graphically in FIG. 5 will be described in greater detail. Assume again that a call has already been received on the NAP 20 and that interaction with the Main TUI Call Flows 26 has already begun. As indicated by paths 6 and 7 of FIG. 1, interaction continues to occur between the Agent 30 of the UMsg Application 24 and the AIM portion (not shown) of the NAP 20. Once the caller is validated (User ID and PIN match) and is known to hold a class of service for universal messaging, the Main TUI Call Flow 26 resumes with a request for e-mail data.

The call state that represents the request for e-mail data (e.g. state 70 of FIG. 5) is a high-level NAP core function within the Agent 30, referred to as the Call Service core function, that allows an asynchronous call flow interaction to be initiated through use of the Call Flow Library 32. The interaction with the NAP dialog is temporarily suspended until the Call Service request is initiated. The first step of the Call Service core function is to obtain the routing SLOT # for the UMsg Application 24 using the GETLIBINX( ) procedure of the Call Flow Library 32. The logical name of the UMsg Application 24 ("UVMSEXPORT") is provided as input and a routing SLOT # is returned as output. Another procedure of the Call Flow Library 32 is then called to invoke execution of the E-mail Access Call Flow 28. A header parameter passed with this call contains the NAP Dialog ID, the NAINDEX for the Main TUI Call Flow entry in the Agent table 40, a NAP timestamp generated for the call, the routing SLOT # of the UMsg Application 24, and the name of the starting call state for the E-mail Access Call Flow 28 to be executed. When the Call Flow Library 32 receives the procedure call it uses the routing SLOT # to determine what call flow provider to call. Because the E-mail Access Call Flows 28 are part of the same UMsg Application 24 as the Main TUI Call Flows 26, the initial routing ends up right back in the UMsg Application 24, but in this case the call flow that is initiated is the E-mail Access Call Flow 28. Before execution of the E-mail Access Call Flow 28 even starts, the Main TUI Call Flow 26 of the UMsg Application 24 regains control of its NAP dialog and continues execution (e.g., by playing the prompt "You have x new voice messages, y faxes" in state 72 of FIG. 5).

The E-mail Access Call Flow 28 is assigned a new unique NAP Dialog ID and a new NAINDEX entry is created in the table 40 by the Agent 30 to store the new value. At this point, the two call flows are executing in parallel and asynchronously of one another. The Agent 30, on behalf of the E-mail Access Call Flow 28, also stores the NAINDEX, NAP Dialog ID, and NAP Timestamp of the invoking Main TUI Call Flow 26 in the respective Return NAINDEX, Return NAP Dialog ID, and Return NAP Timestamp fields of the E-mail Access Call Flow entry in table 40 for use later in replying to the Main TUI Call Flow 26.

The Email Logon & Counts function that the E-mail Access Call Flow 28 invokes in step 82 of FIG. 5 first logs on to the POP3 email server 21 indirectly by utilizing an Email_Logon core function of the Agent 30 to access the UMsgCS Library 34. The Email_Logon core function manages the data level protocol between the UMsgCS Library 34, the Call Flow Library 32, and the Agent 30 on behalf of the UMsg Application 24. The SLOT # of the UMsgCS Library 34 in the routing table of the Call Flow Library 32 is used to obtain the necessary routing information for the UMsgCS Library 34 (as it was originally acquired and saved during initialization of the Agent 30). The Agent 30, on behalf of the E-mail Access Call Flow 28, passes the NAINDEX and NAP Dialog ID values for the E-mail Access Call Flow 28, as well as a new NAP Timestamp value for this request, to the UMsgCS Library 34 in a header associated with the request. The output of the Email_Logon core function will be a session identifier of the e-mail session, which in the present embodiment is comprised of the HEAS Session Index, the UMsgCS Index, and the IP Address for the HEAS server 21.

When the Email_Logon core function is initiated, the E-mail Access Call Flow 28 is suspended until a reply is returned. The UMsgCS Library 34 then creates a new entry in its table 50 and assigns a unique UMsgCS Index to the entry. The UMsgCS Library 34 then saves off the NAP Dialog ID, NAINDEX, and NAP Timestamp values received with the Email_Logon call in the respective fields of the new entry in its table 50. At this point, therefore, a UMsgCS Index is now associated with a NAP Dialog ID and the NAINDEX of the UMsg Application call flow (in this case the E-mail Access Call Flow 28) that made the logon request.

The UMsgCS Library 34 communicates to the server 21 hosting the HEAS 19 by a sockets based interface over TCP/IP, as mentioned above. A data protocol utilized in the HEAS interaction is referred to as the Inter-Host Command Protocol (or IHCP). The header portion of an IHCP request to the HEAS 19 includes some routing information and the UMsgCS Index that needs to be reflected in any response from the HEAS 19.

The HEAS 19 then will process the IHCP request, which in this example is a request to logon to the e-mail server 21. In the present embodiment, the e-mail server 21 is compliant with the POP3 protocol. The HEAS 19 first step determines the location of the POP3 server 21 and the appropriate subscriber sign-on for the subscriber. In the present embodiment, the HEAS 19 determines this information from data stored in a subscriber directory (not shown). This directory is in an external directory accessible through the IP network using the LDAP protocol. Typically the directory is hosted by the Internet Service Provider (ISP) (not shown) that controls the POP server 21. The HEAS 19 then issues a POP3 logon request (process flow identifier number 3 in FIG. 1) to the POP3 server 21. When the logon request is satisfied, a response is returned to the UMsgCS Library 34 via the IHCP protocol over sockets. The real POP3 session identifier (from the POP3 server 21) is saved by the HEAS 19 as part of a HEAS Session Index. The UMsgCS Index transmitted with the request, the HEAS Session Index, and the IP Address of the HEAS server 18 are returned to the UMsgCS Library 34 as part of the IHCP logon response.

When the UMsgCS Library 34 receives the response, it extracts the UMsgCS Index received with the response and looks for a corresponding entry in its state table 50. If an entry is found, the HEAS Session Index is then stored in the corresponding field of the table 50 for future validation and for session cleanup when terminating.

Using the routing SLOT # of the UMsg Application 24 stored in its table entry, the UMsgCS Library 34 then formulates and issues a reply to the UMsg Application call flow (specifically, the E-mail Access Call Flow 28) via the Call Flow Library 32. To ensure proper identification and validation of the reply by the Agent 30 of the UMsg Application 24, the UMsgCS Library 34 includes in the header of the reply the NAP Dialog ID, NAINDEX, and NAP Timestamp that it had received with the original request and that had been stored in its table 50.

The Agent 30, on behalf of the UMsg Application 24, receives the reply. The Agent 30 then determines from the header information of the reply (i.e., the NAINDEX, NAP Dialog ID, and NAP Timestamp) that the reply belongs to the E-mail Access Call Flow 28 that had earlier issued the Email_Logon request. The Agent 30 returns the reply information to the E-mail Access Call Flow 28 thus restarting its NAP dialog (it was previously in a suspended state). Now that one complete round trip has been made to the e-mail server 21, all the necessary identifiers required for coordinating the telephony session with the e-mail session are now known by the E-mail Access Call Flow 28 and are stored in the corresponding fields of its entry in table 40. Using this information, the E-mail Access Call Flow 28 can now issue a request for a count of any new e-mail messages received by the subscriber.

A request for e-mail count information is made by the E-mail Access Call Flow 28 in step 82 by invoking an Email_Counts core function. Like the Email_Logon function, this function manages the data level protocol between the UMsgCS Library 34, the Call Flow Library 32, and the Agent 30. In the present embodiment, the output of the Email_Counts core function will be a count of the combined low and medium priority e-mails of the subscriber and a count of all high priority e-mails.

Once the Email_Counts core function is initiated, the E-mail Access Call Flow 28 is suspended until a reply is returned. From here, the description of the interaction between the Agent 30, the UMsgCS Library 34, the HEAS 19 and the e-mail server 21 (via paths 2, 3, and 4 in FIG. 1) are the same as described for the Email_Logon process, except for the HEAS 19 functionality and the outputs returned.

When the request for e-mail count information reaches the HEAS 19 via an IHCP request from the UMsgCS Library 34, the HEAS 19 will first issue a POP3 STAT command to the POP3 server 21 to determine the total number of e-mails in the subscriber's inbox. Next, the HEAS 19 will use the POP3 TOP n command to partially read the header and body of the e-mails in order to determine the priority of each e-mail. This information is cached for the remainder of the e-mail session managed by the HEAS 19 on behalf of the subscriber. Once the set of counts are obtained, a response is returned to the UMsgCS Library 34 via the IHCP over sockets.

The UMsgCS Library 34 will, in turn, pass the reply to the Agent 30 via the Call Flow Library 32. Again, the UMsgCS Library 34 will include in a header of its reply the NAP Dialog ID, NAINDEX and NAP Timestamp that it received with the original request from the E-mail Access Call Flow 28 and stored in the corresponding entry of its table 50.

When the Agent 30 (on behalf of the E-mail Access Call Flow 28 of the UMsg Application 24) receives the reply, the Agent 30 determines from the header information in the reply that the reply belongs to the E-mail Access Call Flow 28 that had earlier issued the Email_Counts request. The Agent 30 returns the reply information to the E-mail Access Call Flow 28 thus restarting its dialog (it was previously in a suspended state). The two interactions with the HEAS 19 (logon and counts) are now complete and the E-mail Access Call Flow 28 now needs to return the critical output information back to the Main TUI Call Flow 26 (which has continued executing as illustrated in FIG. 5).

The reply to the MAIN TUI Call Flow 26 from the E-mail Access Call Flow 28 is accomplished initially by a Reply Service core function of the Agent 30. The Reply Service core function queues a response to the initiator of the original request by utilizing the same Call Flow Library procedures used to make the original request. The difference is that the reply utilizes the routing SLOT # that was saved in the state table 40 back when the original request was made by the Main TUI Call Flow 26. This routing SLOT # is then used to find the original requester from the routing table of the Call Flow Library 32. In this case, the original requester was the Main TUI Call Flow 26, which is part of the same UMsg Application 24. The outputs that the E-mail Access Call Flow 28 provides in the reply to the Main TUI Call Flow 26 are the e-mail counts, and the e-mail session identifier, comprised of the HEAS Session Index, the UMsgCS Index, and the IP Address for the HEAS server 21. In addition, the NAP Dialog ID, NAINDEX, and NAP Timestamp of the original Main TUI Call Flow request, i.e., the ones saved in the Return NAINDEX, Return NAP Dialog ID, and Return NAP Timestamp fields by the Agent 30 on behalf of the E-mail Access Call Flow 28, are passed back to the MAIN TUI Call Flow 26 in a header of the reply.

Once the Agent 30 receives the reply, it determines whether there is an active call flow expecting a reply. This is accomplished by cross-checking the information contained in the header parameter of the reply. Specifically, the NAINDEX and NAP Dialog ID of the requestor must mach up with that of the reply, and the NAP timestamp returned with the reply should match up with the NAP timestamp in the table 40 entry of the requestor.

The use of timestamps is important, because there may be situations where the Main TUI Call Flow 26 makes a request for e-mail access and does not obtain a response in time (this is a time out). The Main TUI Call Flow 26 may then choose to issue another request to the E-mail Access Service, but the first request may still produce a reply after the time out and after the second request has already been sent. The NAP Timestamp created with each new request and passed back in every reply ensures that the right replies get matched to the right requests. Note that in other embodiments, the timestamp created for the original requesting Main TUI Call Flow 26 could be used also in connection with the interactions between the E-mail Access Call Flows 28 and UMsgCS Library 34, rather than generating new timestamps for each of those interactions.

A Check_Service core function is invoked in the "Check For Response" states 74, 80 of the Main TUI Call Flow 26 in order to synchronize with the expected E-mail Access Call Flow reply. This function checks the queue of available replies to determine if the appropriate reply is present. When the reply is successfully received, the NAINDEX entry for the Main TUI Call Flow in the table 40 is updated with the e-mail session identifier returned with the reply (i.e., the UMsgCS Index, IP Address of HEAS Server, and HEAS Session Index). This e-mail session identifier is used in subsequent requests for further actions relating to the subscriber's e-mails, such as listening to the e-mail text. Although a different E-Mail Access Call Flow 28 may make such a request, from the perspective of the HEAS 19, the same session is being utilized.

The combination of session identifiers, the tables 40, 50, and 60 in which they are stored, and the manner in which they are passed in both requests and replies contribute significantly to the coordination that the present invention achieves between a telephony session and an e-mail session. As described above, the Agent 30 (on behalf of the UMsg Application 24), the Call Flow Library 32, the UMsgCS Library 34, and the HEAS 19 are designed for full asynchronous communication. Each of these components is designed to handle the multiple threading and levels of concurrency required for the present invention to be utilized in a high transaction messaging environment.

Additionally, although not all of them may have been described above, a timeout condition is placed on each component-to-component interaction, including (i) interactions between the Main TUI Call Flows 26 and E-Mail Access Call Flows 28 via paths 1 and 5 in FIG. 1, (ii) interactions between the E-Mail Access Call Flows 28 and the UMsgCS Library 34 via paths 2 and 4 of FIG. 1, (iii) interactions between the UMsgCS Library 34 and the HEAS 19, and (iv) interactions between the HEAS 19 and the e-mail server 21 via path 3 of FIG. 1. This ensures that if a reply is not received from a component within a predefined timeout period, the other components can be informed of the timeout condition. In addition, the HEAS 19, UMsgCS Library 34, and Agent 30 provide cleanup mechanisms for situations where dialogs become abandoned due to timeouts that have occurred at lower levels of an interaction.

At least portions of the present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

As the foregoing illustrates, the present invention is directed to methods and apparatus for coordinating a telephony session on a voice messaging platform with an e-mail session on an e-mail messaging platform in an integrated universal messaging system in a manner that bridges the gap between user experiences in the two different environments. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for coordinating a telephone handset session with an e-mail session in a universal messaging system that comprises a voice messaging platform integrated with an electronic mail (e-mail) messaging platform, wherein the voice messaging platform interfaces to a telephone network to process calls from subscribers connected to the telephone network via telephone handsets, said method comprising the steps of:

(a) receiving a call on the voice messaging platform placed by a subscriber from a telephone handset connected to the telephone network and processing the call on the voice messaging platform in accordance with a first call flow, the subscriber having an account on the e-mail messaging platform;

(b) invoking from the first call flow, a second call flow that initiates access to the subscriber's account on the e-mail messaging platform, said second call flow executing in parallel with, and asynchronously of, said first call flow;

(c) continuing to execute the first call flow while said second call flow is executing;

(d) determining at a given state of the first call flow whether a response is available from the second call flow and if a response is available, then processing the response, but if a response from the second call flow is delayed and thus not presently available at said given state of the first call flow then playing one or more prompts by the first call flow to mask at least a portion of the delay experienced in receiving a response from the second call flow, wherein said one or more prompts provide an indication to said subscriber that a wait is in progress.

2. The method recited in claim 1, wherein step (b) is performed in response to a request by the subscriber for access to the subscriber's account on the e-mail messaging platform.

3. The method recited in claim 1, wherein step (b) is performed automatically by the first call flow on behalf of the subscriber.

4. The method recited in claim 1, further comprising the steps of:

(e) creating a telephony session identifier associated with the subscriber's session on the voice messaging platform and an e-mail session identifier associated with accesses to the e-mail messaging platform by the second call flow during the subscriber's session on the voice messaging platform; and (f) maintaining an association between the telephony session identifier and the e-mail session identifier.

5. A method for coordinating a telephone handset session with an e-mail session in a universal messaging system that comprises a voice messaging platform integrated with an electronic mail (e-mail) messaging platform, wherein the voice messaging platform interfaces to a telephone network to process calls from subscribers connected to the telephone network via telephone handsets, said method comprising the steps of:

(a) receiving a call on the voice messaging platform placed by a subscriber from a telephone handset connected to the telephone network and processing the call on the voice messaging platform in accordance with a first call flow, the subscriber having an account on the e-mail messaging platform;

(b) invoking from the first call flow, a second call flow that initiates access to the subscriber's account on the e-mail messaging platform, said second call flow executing in parallel with, and asynchronously of, said first call flow;

(c) continuing to execute the first call flow while said second call flow is executing;

(d) playing one or more prompts by the first call flow, as needed, to mask at least a portion of any delays experienced in receiving a response from the second call flow, (g) generating a timestamp at the time that access to the subscriber's e-mail account is initiated by the first call flow, the timestamp being passed to the second call flow so that it can be returned by the second call flow in any response provided to the first call flow; and (h) upon receiving a response from the second call flow, comparing a timestamp returned with the response to the original timestamp generated in step (g) to ensure that the response provided by the second call flow corresponds to the particular access initiated by the first call flow.

6. The method recited in claim 5, further comprising the steps of:

(i) creating a telephony session identifier associated with the subscriber's session on the voice messaging platform;

(j) passing the telephony session identifier to the second call flow in addition to the timestamp so that both the timestamp and the telephony session identifier can be returned by the second call flow in any response provided to the first call flow; and (k) upon receiving a response from the second call flow, comparing both a timestamp and a telephony session identifier returned with the response to the original timestamp and telephony session identifier generated in steps (g) and (i) to ensure that the response provided by the second call flow corresponds to the particular access initiated by the first call flow.

7. A universal messaging system comprising:

a voice messaging platform interfaced to a telephone network;

an application executing on the voice messaging platform that comprises at least a first call flow and a second call flow, the application processing calls received by the voice messaging platform from subscribers connected to the telephone network via telephone handsets in accordance with said first call flow;

an e-mail platform comprising an e-mail server connected to a network external to the telephone network, selected subscribers of the voice messaging platform having respective accounts on the e-mail server in which e-mail messages of the subscribers are stored; and an interface component connected to the external network, the interface component providing access to the e-mail server via the external network upon request from the voice messaging platform, the first call flow invoking the second call flow to initiate access to a subscriber account on the e-mail messaging platform, the second call flow thereafter executing in parallel with, and asynchronously of, the first call flow and interacting with said interface component to access the subscriber account on the e-mail server of the e-mail messaging platform, the first call flow continuing to execute while the second call flow is executing and determining, at a given present state of the first call flow, whether a response is available from the second call flow and if a response is available, then processing the response, but if a response from the second call flow is not available due to a present delay at said given present state of the first call flow then playing one or more prompts, to mask at least a portion of the delay experienced in receiving a response from the second call flow, whereby said one or more prompts include an indication intelligible to said user indicating that a wait is in progress.

8. The universal messaging system recited in claim 7, wherein the first call flow invokes the second call flow either (i) in response to a request by the subscriber for access to the subscriber's account on the e-mail messaging platform or (ii) automatically on behalf of the subscriber.

9. The universal messaging system recited in claim 7, wherein the voice messaging platform creates a telephony session identifier associated with a subscriber's session on the voice messaging platform, and wherein said interface component creates an e-mail session identifier associated with accesses to the e-mail messaging platform for that subscriber during the subscriber's session on the voice messaging platform, and further wherein the voice messaging platform maintains an association between the telephony session identifier and respective e-mail session identifier.

10. A universal messaging system comprising:

a voice messaging platform interfaced to a telephone network;

an application executing on the voice messaging platform that comprises at least a first call flow and a second call flow, the application processing calls received by the voice messaging platform from subscribers connected to the telephone network via telephone handsets in accordance with said first call flow;

an e-mail platform comprising an e-mail server connected to a network external to the telephone network, selected subscribers of the voice messaging platform having respective accounts on the e-mail server in which e-mail messages of the subscribers are stored; and an interface component connected to the external network, the interface component providing access to the e-mail server via the external network upon request from the voice messaging platform, the first call flow invoking the second call flow to initiate access to a subscriber account on the e-mail messaging platform, the second call flow thereafter executing in parallel with, and asynchronously of, the first call flow and interacting with said interface component to access the subscriber account on the e-mail server of the e-mail messaging platform, the first call flow continuing to execute while the second call flow is executing and playing one or more prompts, as needed, to mask at least a portion of any delays experienced in receiving a response from the second call flow, and wherein the application executing on the voice messaging platform generates a timestamp at the time that access to a subscriber's e-mail account is initiated by the first call flow, the timestamp being passed to the second call flow so that it can be returned by the second call flow in any response provided to the first call flow, the application, upon receiving a response from the second call flow, compares a timestamp returned with the response to the original timestamp generated by the application to ensure that the response provided by the second call flow corresponds to the particular access initiated by the first call flow.

11. The universal messaging system recited in claim 10, wherein the voice messaging platform creates a telephony session identifier associated with the subscriber's session on the voice messaging platform, and wherein the telephony session identifier is passed to the second call flow in addition to the timestamp so that both the timestamp and the telephony session identifier can be returned by the second call flow in any response provided to the first call flow, the first call flow, upon receiving a response from the second call flow, comparing both a timestamp and a telephony session identifier returned with the response to the original timestamp and telephony session identifier passed to the second call flow to ensure that the response provided by the second call flow corresponds to the particular access initiated by the first call flow.

12. The method recited in claim 1, further comprising the steps of:

(g) generating a timestamp at the time that access to the subscriber's e-mail account is initiated by the first call flow, the timestamp being passed to the second call flow so that it can be returned by the second call flow in any response provided to the first call flow; and (h) upon receiving a response from the second call flow, comparing a timestamp returned with the response to the original timestamp generated in step (g) to ensure that the response provided by the second call flow corresponds to the particular access initiated by the first call flow.

13. The method recited in claim 12, further comprising the steps of:

(i) creating a telephony session identifier associated with the subscriber's session on the voice messaging platform;

(j) passing the telephony session identifier to the second call flow in addition to the timestamp so that both the timestamp and the telephony session identifier can be returned by the second call flow in any response provided to the first call flow; and (k) upon receiving a response from the second call flow, comparing both a timestamp and a telephony session identifier returned with the response to the original timestamp and telephony session identifier generated in steps (g) and (i) to ensure that the response provided by the second call flow corresponds to the particular access initiated by the first call flow.

14. The universal messaging system recited in claim 7, wherein the application executing on the voice messaging platform generates a timestamp at the time that access to a subscriber's e-mail account is initiated by the first call flow, the timestamp being passed to the second call flow so that it can be returned by the second call flow in any response provided to the first call flow, the application, upon receiving a response from the second call flow, compares a timestamp returned with the response to the original timestamp generated by the application to ensure that the response provided by the second call flow corresponds to the particular access initiated by the first call flow, and wherein the voice messaging platform creates a telephony session identifier associated with the subscriber's session on the voice messaging platform, and wherein the telephony session identifier is passed to the second call flow in addition to the timestamp so that both the timestamp and the telephony session identifier can be returned by the second call flow in any response provided to the first call flow, the first call flow, upon receiving a response from the second call flow, comparing both a timestamp and a telephony session identifier returned with the response to the original timestamp and telephony session identifier passed to the second call flow to ensure that the response provided by the second call flow corresponds to the particular access initiated by the first call flow.

* * * * *